United States Patent
Kawamoto et al.

(10) Patent No.: US 10,539,299 B2
(45) Date of Patent: Jan. 21, 2020

(54) DISPLAY DEVICE

(71) Applicants: KABUSHIKI KAISHA TOYOTA JIDOSHOKKI, Kariya-shi, Aichi (JP); TOYOTA JIDOSHA KABUSHIKI KAISHA, Toyota-shi, Aichi (JP); KABUSHIKIKAISHA TOKAIRIKA DENKI SEISAKUSHO, Niwa-gun, Aichi (JP)

(72) Inventors: Yuji Kawamoto, Kariya (JP); Kouji Iwamoto, Toyota (JP); Ryosuke Okuda, Niwa-gun (JP)

(73) Assignees: KABUSHIKI KAISHA TOYOTA JIDOSHOKKI, Kariya-shi, Aichi (JP); TOYOTA JIDOSHA KABUSHIKI KAISHA, Toyota-shi, Aichi (JP); KABUSHIKIKAISHA TOKAIRIKA DENKI SEISAKUSHO, Niwa-gun, Aichi (JP)

( * ) Notice: Subject to any disclaimer, the term of this patent is extended or adjusted under 35 U.S.C. 154(b) by 0 days.

(21) Appl. No.: 16/357,879

(22) Filed: Mar. 19, 2019

(65) Prior Publication Data
US 2019/0293265 A1  Sep. 26, 2019

(30) Foreign Application Priority Data
Mar. 20, 2018 (JP) .................................. 2018-052938

(51) Int. Cl.
*F21V 11/00* (2015.01)
*F21V 7/28* (2018.01)
*F21V 13/10* (2006.01)

(52) U.S. Cl.
CPC ................ *F21V 11/00* (2013.01); *F21V 7/28* (2018.02); *F21V 13/10* (2013.01)

(58) Field of Classification Search
CPC ............. F21V 11/00; F21V 7/28; F21V 13/10
See application file for complete search history.

(56) References Cited

U.S. PATENT DOCUMENTS 9,945,539 B1 *  4/2018 Su ........................... G09F 13/04

FOREIGN PATENT DOCUMENTS

JP            08292071 A      11/1996

* cited by examiner

*Primary Examiner* — Thomas M Sember
(74) *Attorney, Agent, or Firm* — Sughrue Mion, PLLC

(57) ABSTRACT

A display device includes a panel, a light source, and a display target. The panel has a transparent resin portion and a reflective film formed on a front surface of the transparent resin portion, the display target has a first display layer printed on a front surface of the reflective film and a second display layer printed on a front surface of the first display layer, the first display layer is printed so as to shield the illumination light emitted from the light source, the second display layer is printed in a color different from a color of the first display layer, an outer dimension of the second display layer is smaller than an outer dimension of the first display layer, and a border portion formed by an edge portion of the front surface of the first display layer is provided at an edge portion of the display target.

3 Claims, 3 Drawing Sheets

DISPLAY DEVICE

TECHNICAL FIELD

The present disclosure relates to a display device.

BACKGROUND

As a display device in the related art, for example, a technique disclosed in Japanese Unexamined Patent Publication No. H8-292071 is known. The display device disclosed in Japanese Unexamined Patent Publication No. H8-292071 includes a translucent layer which is directly coated on the front surface of a dial plate and is made of a white-based translucent ink, a first light shielding layer which is coated from above the translucent layer and is made of a black light shielding ink, and a second light shielding layer which is coated from above the first light shielding layer so as to exclude a scale portion and is made of a white-based light shielding ink.

SUMMARY

However, the above-described related art has the following problems. That is, when illumination with illumination light emitted from a light source is transmitted in a state where external light hits the scale portion (display target), since contrast is lowered if an illumination color of the transmitted illumination and an ink color of the second light shielding layer are close to each other, it becomes difficult to distinguish the display target, and the visibility of the display target may deteriorate.

An object of the present disclosure is to provide a display device capable of improving the visibility of a display target when illumination with illumination light emitted from a light source is transmitted in a state where external light hits the display target.

According to an aspect of the present disclosure, there is provided a display device including a panel that reflects and transmits light, a light source disposed on a back surface side of the panel and emits illumination light, and a display target provided on a front surface of the panel. The panel has a transparent resin portion and a reflective film formed on a front surface of the transparent resin portion, the display target has a first display layer printed on a front surface of the reflective film and a second display layer printed on a front surface of the first display layer, the first display layer is printed so as to shield the illumination light emitted from the light source, the second display layer is printed in a color different from a color of the first display layer, an outer dimension of the second display layer is smaller than an outer dimension of the first display layer, and a border portion formed by an edge portion of the front surface of the first display layer is provided at an edge portion of the display target.

In the display device, the border portion formed by the edge portion of the front surface of the first display layer is provided at the edge portion of the display target. Therefore, when external light hits the display target, not only the most of the display target appears as the color of the second display layer, but also the border portion of the display target appears as the color of the first display layer. Accordingly, when illumination light is emitted from the light source in a state where the external light hits the display target, since the display target becomes clear due to the border portion even when the color of the illumination transmitted through the panel with the illumination light emitted from the light source is close to the color of the second display layer, it is possible to easily distinguish the display target. Thus, when illumination with the illumination light emitted from the light source is transmitted through the panel in a state where the external light hits the display target, the visibility of the display target is improved.

The color of the first display layer may be of the same base as a color of the reflective film. With the configuration, when the display target is displayed only by external light without emitting the illumination light from the light source, the difference in color between the reflective film of the panel and the border portion of the display target becomes less noticeable.

The border portion may be continuously provided over the entire edge portion of the display target. With the configuration, since even when the color of the illumination transmitted through the panel is close to the color of the second display layer, the display target can be more easily distinguished, the visibility of the display target is further improved.

According to the present disclosure, when the illumination with the illumination light emitted from the light source is transmitted in a state where external light hits the display target, it is possible to improve the visibility of the display target.

DETAILED DESCRIPTION

Figure 1:
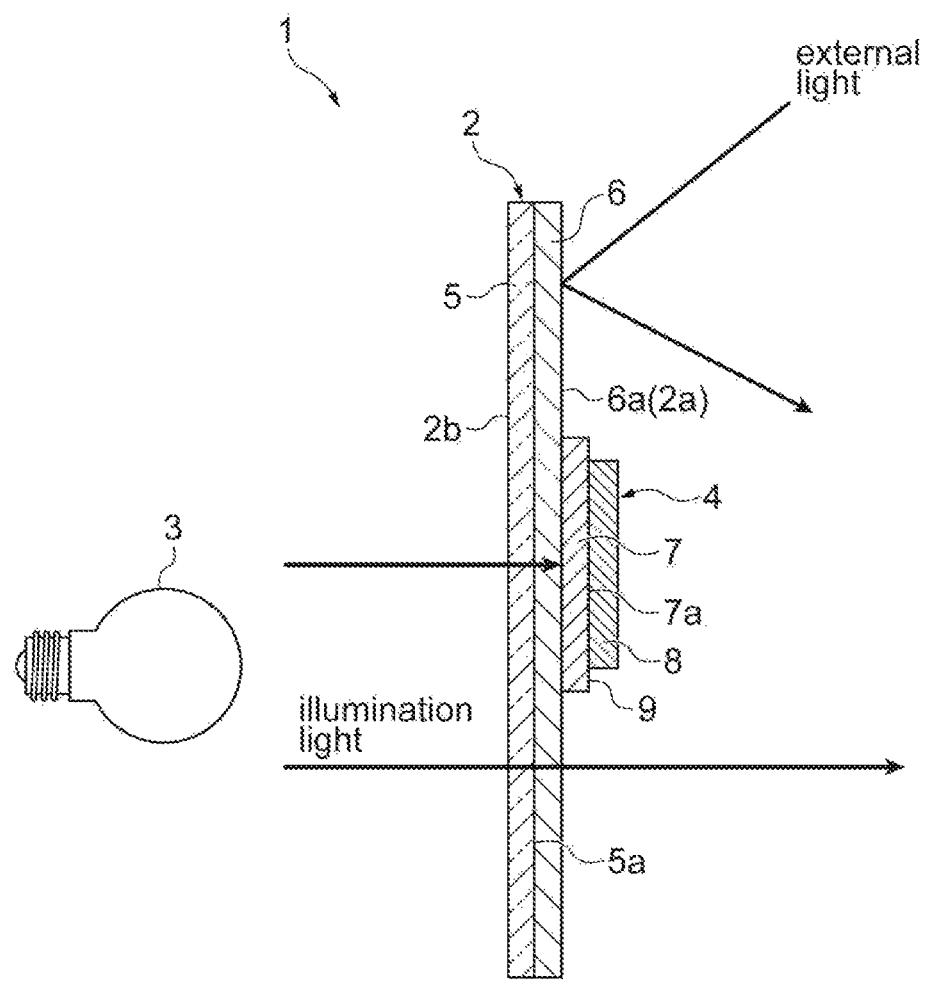
FIG. 1 is a cross-sectional view showing a display device according to an embodiment of the present disclosure.

Hereinafter, an embodiment of the present disclosure will be described in detail with reference to the drawings. In the drawings, the same or equivalent elements are denoted by the same reference numerals, and duplicate description is omitted.

FIG. 1 is a cross-sectional view showing a display device according to the embodiment of the present disclosure. In FIG. 1, a display device 1 of the present embodiment is a device that displays characters, symbols, shapes, or the like provided on a switch, a meter, or the like mounted on a vehicle.

The display device 1 includes a half mirror 2 (panel) for reflecting and transmitting light, a plurality of light sources 3 (in FIG. 1, only one is shown) disposed on the back surface 2b side of the half mirror 2 and emitting illumination light, and a display target 4 provided on a front surface 2a of the half mirror 2.

The half mirror 2 has a transparent resin portion 5 and a reflective film 6 formed on a surface 5a of the transparent resin portion 5. The reflective film 6 is configured with a metal vapor deposition film or metal plating. The reflective film 6 has a color (here, black-based color). The illumination light emitted from the light source 3 is transmitted through the half mirror 2. External light introduced from the front surface 2a side of the half mirror 2 is reflected by a front surface 6a (corresponding to the front surface 2a) of the reflective film 6.

As the light source 3, for example, an LED lamp or the like is used. The plurality of light sources 3 emits illumination light having different colors. One of the plurality of light sources 3 emits white-based illumination light. The light source 3 to be used among the plurality of light sources 3 is switched by a switch (not shown).

The display target 4 has a first display layer 7 printed on the front surface 6a of the reflective film 6 and a second display layer 8 printed on a front surface 7a of the first display layer 7. In other words, the first display layer 7 and the second display layer 8 are disposed so as to overlap the reflective film 6.

The first display layer 7 is printed so as to shield the illumination light emitted from the light source 3. The color of the first display layer 7 is of the same base as the color of the reflective film 6 (here, black-based color). The second display layer 8 is printed in a color different from that of the first display layer 7 (here, white-based color).

The first display layer 7 and the second display layer 8 have the same outer shape in a plan view as seen in a lamination direction of the first display layer 7 and the second display layer 8. In this case, the outer shapes of the first display layer 7 and the second display layer 8 may not be exactly the same, and may be substantially the same. An outer dimension of the second display layer 8 is smaller than an outer dimension of the first display layer 7. The outer dimensions of the first display layer 7 and the second display layer 8 are dimensions of the first display layer 7 and the second display layer 8 in a plan view.

A border portion 9 formed by an edge portion of the front surface 7a of the first display layer 7 is provided at an edge portion of the display target 4. Therefore, here, the color of the border portion 9 is a black-based color. The border portion 9 is continuously provided over the entire edge portion of the display target 4.

FIG. 2 is a plan view showing a display pattern of the display target 4. In FIG. 2, the display target 4 is a character "T".

Figure 2C:
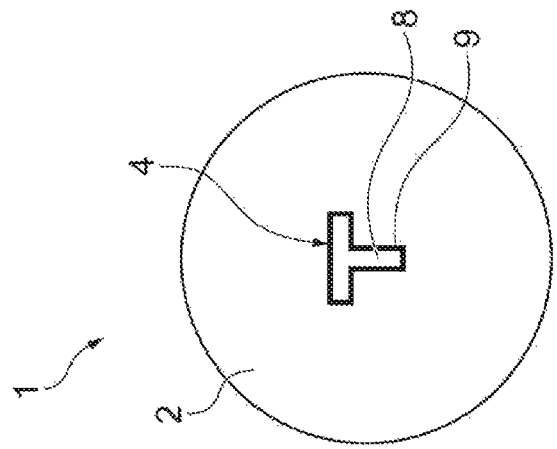
FIGS. 2A, 2B and 2C are plan views showing display patterns of a display target.
Figure 2B:
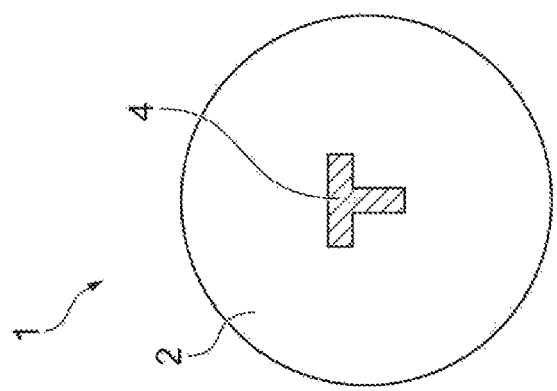
Figure 2A:
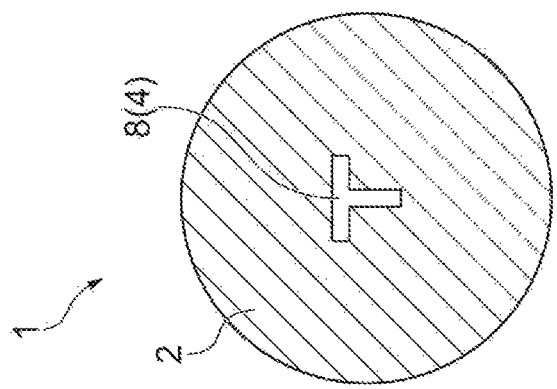

In the daytime, since the surrounding environment is bright due to external light, the light source 3 is not lit. In this case, since the illumination light is not emitted from the light source 3, as shown in FIG. 2A, the periphery of the display target 4 in the half mirror 2 appears as a black-based color. The second display layer 8 of the display target 4 appears as a white-based color due to external light. Since the printing color of the first display layer 7 is a black-based color, the edge portion (border portion 9) of the display target 4 appears as a black-based color even if there is external light. Accordingly, it is possible to easily distinguish the display target 4.

In the nighttime, since the external light is not introduced and the surrounding environment is dark, the light source 3 is lit. In this case, the illumination light emitted from the light source 3 is transmitted through the half mirror 2. Therefore, as shown in FIG. 2B, the periphery of the display target 4 in the half mirror 2 appears as a white-based color. In addition, since the first display layer 7 of the display target 4 shields the illumination light emitted from the light source 3 and the external light does not hit the display target 4, the display target 4 appears as a black-based color as a whole. Accordingly, it is possible to easily distinguish the display target 4.

When the surrounding environment is somewhat dimmer even during the daytime, the light source 3 is lit. In this case, the illumination light emitted from the light source 3 is transmitted through the half mirror 2. Therefore, as shown in FIG. 2C, the periphery of the display target 4 in the half mirror 2 appears as a white-based color. The second display layer 8 of the display target 4 appears as a white-based color due to external light. However, since the printing color of the first display layer 7 is a black-based color, the edge portion (border portion 9) of the display target 4 appears as a black-based color even if there is external light. Accordingly, it is possible to easily distinguish the display target 4 by the border portion 9.

Figure 3:
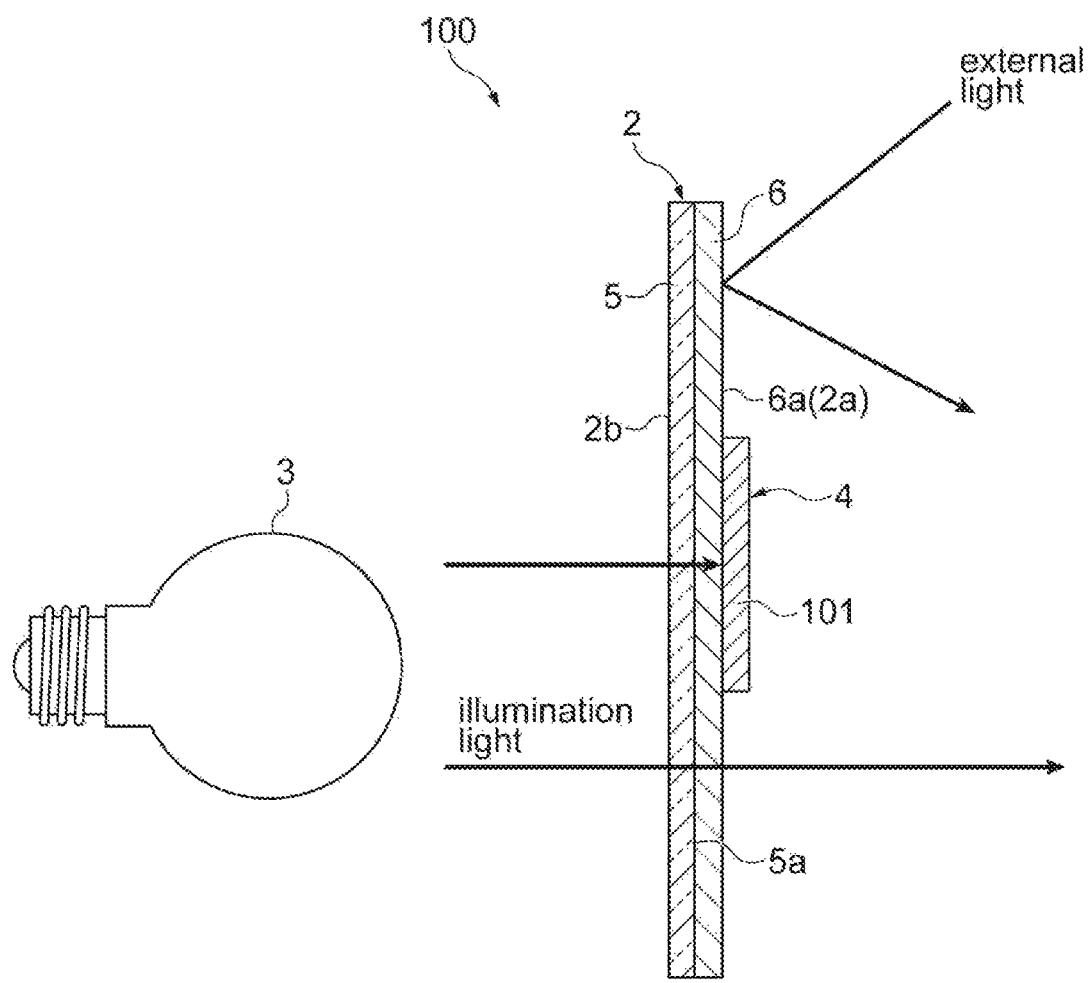
FIG. 3 is a cross-sectional view showing an example of a display device in the related art as a comparative example.

FIG. 3 is a cross-sectional view showing an example of a display device in the related art as a comparative example. In FIG. 3, in a display device 100 of the present comparative example, a display target 4 is configured only with a display portion 101 printed on a front surface 6a of a reflective film 6 of a half mirror 2. The display portion 101 is printed in a white-based color. Other configurations are the same as those in the above embodiment.

In the present comparative example, when the surrounding environment is somewhat dimmer even during daytime, illumination light emitted from a light source 3 is transmitted through the half mirror 2. Therefore, the periphery of the display portion 101 in the half mirror 2 appears as a white-based color. In addition, the display portion 101 also appears as a white-based color due to external light. Since the illumination color of the illumination transmitted through the half mirror 2 with the illumination light emitted from the light source 3 and the printing color of the display portion 101 are the same as a white-based color as described above, the contrast is low, it becomes difficult to distinguish the display target 4, and as a result, the visibility of the display target 4 deteriorates.

In response to such a problem, in the present embodiment, the border portion 9 formed by the edge portion of the front surface 7a of the first display layer 7 is provided at the edge portion of the display target 4. Therefore, when external light hits the display target 4, not only the most of the display target 4 appears as the color of the second display layer 8, but also the border portion 9 of the display target 4 appears as the color of the first display layer 7. Accordingly, when illumination light is emitted from the light source 3 in a state where the external light hits the display target 4, since the display target 4 becomes clear by the border portion 9 even when the color of the illumination transmitted through the half mirror 2 with the illumination light emitted from the light source 3 is close to the color of the second display layer 8, it is possible to easily distinguish the display target 4. Thus, when the illumination with the illumination light emitted from the light source 3 is transmitted through the half mirror 2 in a state where the external light hits the display target 4, the visibility of the display target 4 is improved.

Here, in order to make it easy to distinguish the display target when the illumination color and the printing color are close to each other, it is conceivable to use a bordering technique combining printing and laser. With such a bordering technique, it is necessary to peel off coating using laser, but management of the laser light is extremely difficult and cost increases.

In the present embodiment, since the border portion 9 is formed on the display target 4 only by superimposing the first display layer 7 and the second display layer 8 on the front surface 2a of the half mirror 2 by printing, it is not necessary to peel off coating using laser. Therefore, it is possible to improve the visibility of the display target 4 with a low-cost configuration.

Further, in the present embodiment, since the color of the first display layer 7 is of the same base as the color of the reflective film 6 of the half mirror 2, when the display target 4 is displayed only by external light without emitting the illumination light from the light source 3, the difference in color between the reflective film 6 of the half mirror 2 and the border portion 9 of the display target 4 becomes less noticeable.

In the present embodiment, the border portion 9 is continuously provided over the entire edge portion of the display target 4. Therefore, since even when the color of the illumination transmitted through the half mirror 2 is close to the color of the second display layer 8, the display target 4 can be more easily distinguished, the visibility of the display target 4 is further improved.

The present disclosure is not limited to the above embodiment. For example, in the above embodiment, the second display layer 8 is printed in a color of the same base as the color of the illumination light emitted from the light source 3; however, the present disclosure is not limited thereto, the second display layer 8 may be printed in a color close to the color of the illumination light emitted from the light source 3 (for example, light gray with respect to white-based color).

In the above embodiment, the first display layer 7 is printed in a color of the same base as the color of the reflective film 6 of the half mirror 2; however, the present disclosure is not limited thereto, the first display layer 7 may be printed in a color different from the color of the reflective film 6 as long as the first display layer 7 can shield the illumination light emitted from the light source 3.

In the above embodiment, the border portion 9 is continuously provided over the entire edge portion of the display target 4; however, the present disclosure is not limited thereto, the border portion 9 may be intermittently provided at the edge portion of the display target 4. That is, the border portion 9 may be provided at a part of the edge portion of the display target 4. Even when the border portion 9 is intermittently provided at the edge portion of the display target 4, the display target 4 may become clear by displaying a shadow.

In addition, in the above embodiment, the plurality of light sources 3 is provided, but the number of the light sources 3 may be one. In this case, the light source 3 emits illumination light of a color of the same base as the printing color of the second display layer 8 or a color close to the printing color of the second display layer 8.

Further, the display device 1 of the above embodiment is mounted on a vehicle, but the present disclosure is also applicable to applications other than vehicles.

What is claimed is:

1. A display device comprising:
a panel that reflects and transmits light;
a light source disposed on a back surface side of the panel and emits illumination light; and
a display target provided on a front surface of the panel,
wherein the panel has a transparent resin portion and a reflective film formed on a front surface of the transparent resin portion,
the display target has a first display layer printed on a front surface of the reflective film and a second display layer printed on a front surface of the first display layer,
the first display layer is printed so as to shield the illumination light emitted from the light source,
the second display layer is printed in a color different from a color of the first display layer,
an outer dimension of the second display layer is smaller than an outer dimension of the first display layer, and
a border portion formed by an edge portion of the front surface of the first display layer is provided at an edge portion of the display target.

2. The display device according to claim 1, wherein the color of the first display layer is of the same base as a color of the reflective film.

3. The display device according to claim 1, wherein the border portion is continuously provided over an entire edge portion of the display target.

* * * * *